April 21, 1964

NOBUO SENSUI ETAL 3,129,787

LUBRICANT SUPPLY DEVICE

Filed June 19, 1961

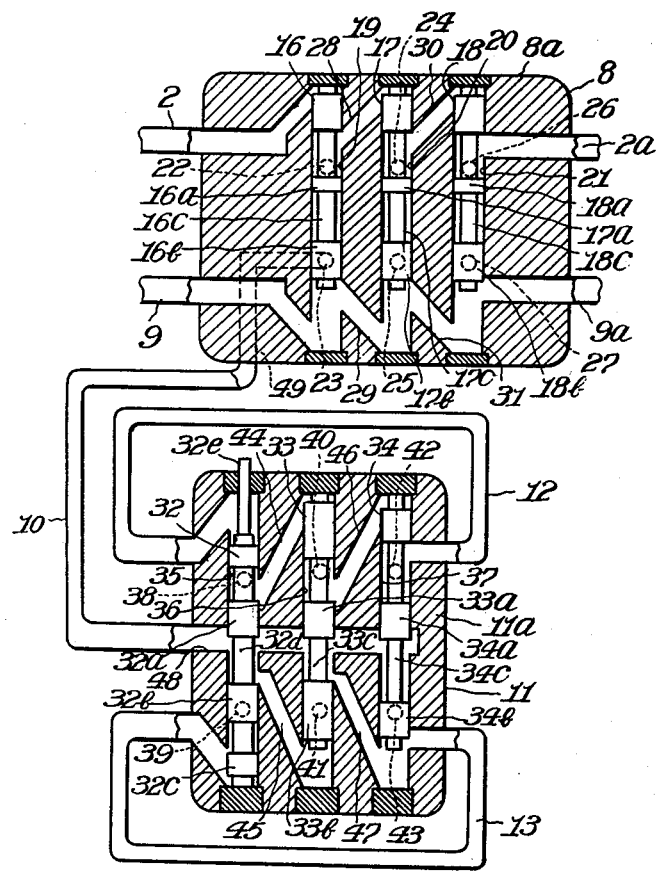

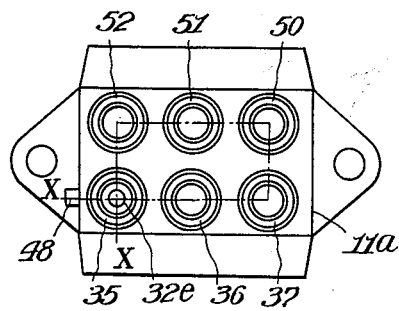
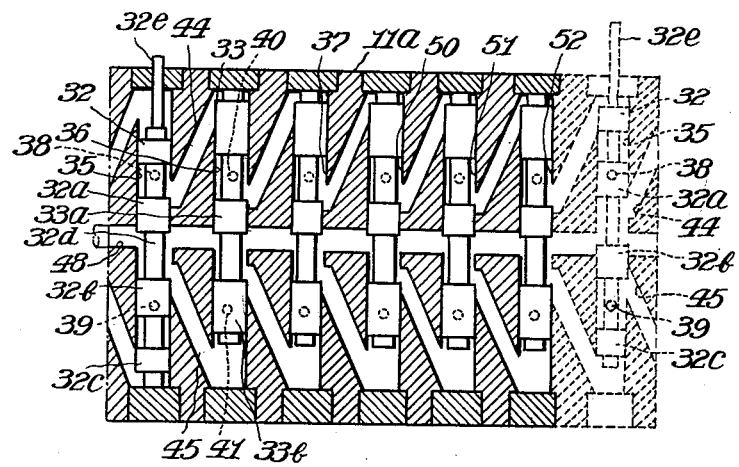

United States Patent Office 3,129,787
Patented Apr. 21, 1964

3,129,787
LUBRICANT SUPPLY DEVICE
Nobuo Sensui, Tsurumi-ku, Yokohama-shi, Shigeru Aoki, Shibuya-ku, Tokyo-to, and Tadashi Yoshikawa, Tsurumi-ku, Yokohama-shi, Japan, assignors to Shibaura Kyodokogyo Kabushiki Kaisha (known as Shibaura United Engineering Co., Ltd.), Yokohama-shi, Japan, a joint-stock company of Japan
Filed June 19, 1961, Ser. No. 117,916
1 Claim. (Cl. 184—7)

This invention relates to a lubricant supply device, more particularly to a centralized lubricant supply device adapted to supply different quantities of lubricant at different intervals of time to a group of portions or machine parts requiring an adequate lubricant supply.

A conventional centralized lubricant supply device now widely used in vehicles, machine tools and the like comprises a casing, a plurality of spaced parallel cylinders in said casing, a tandem type piston adapted to slide in each of said cylinders under the action of the lubricant under pressure so as to supply the lubricant contained at one end portion of one cylinder to said portion through a lubricant outlet port of the preceding cylinder.

Such a lubricant supply of a construction outlined above, however, cannot vary the quantity of lubricant supply or interval of lubricant supply to different parts included in the same lubricant supply system. Automobiles and the like have many moving parts such as axle bearings which require a supply of lubricant of different quantities at different intervals of time. In order to meet such a requirement it has been necessary to use a plurality of lubricant supply devices or systems.

Accordingly, a principal object of the present invention is to provide an improved lubricant supply device by which the quantity and interval of the supply of lubricant can be varied as desired by using a set of distributing valves.

Another object of the present invention is to provide a lubricant supply means wherein one of the lubricant outlet ports of a first lubricant supply device is connected with the lubricant inlet port of a second lubricant supply device containing a combined change-over and distributing valve.

Still another object of this invention is to provide the lubricant inlet port at substantially the central portion of each of several parallel cylinders disposed in the casing of said second lubricant supply device.

Another object of this invention is to provide a lubricant path change-over indicating device for the combined change-over and distributing valve contained in the first cylinder of the second lubricant supply device.

Briefly stated, in accordance with this invention there are provided a first or primary lubricant supply device comprising a casing, a plurality of spaced parallel cylinders in said casing, said cylinders being interconnected by lubricant conduits, a plurality of axially spaced lubricant outlet ports opening in each of said cylinders, a plurality of distributing valves each including a plurality of axially spaced pistons connected in tandem by a piston rod and adapted to slide in each of said cylinders, a pair of lubricant supply conduits opening at the opposite ends of the first cylinder for supplying thereto a suitable lubricant such as grease or oil under pressure; and a second or secondary lubricant supply device of generally the same construction as the first lubricant supply device except that a combined change-over and distributing valve is disposed in its first cylinder. A lubricant conduit opening at substantially the central portion of the respective cylinders in said second lubricant supply device communicates with one of the lubricant outlet ports of the first lubricant supply device. When supplied from the outside with suitable lubricant under pressure, the distributing valves in the first lubricant supply device operate in a predetermined order to supply a predetermined quantity of lubricant to the desired portions or machine parts. When all machine parts associated with the first lubricant supply device have been supplied with a required quantity of lubricant, the lubricant is then supplied to the second lubricant supply device from one of the lubricant outlet ports of the first lubricant supply device to operate the former in the same manner as above explained. In the second lubricant supply device, the lubricant in the last cylinder is introduced into the first cylinder thereof containing the combined change-over and distributing valve to change-over the lubricant paths. This change-over is indicated by an indicator attached to the combined change-over and distributing valve.

This invention can be more fully understood from the following description taken in consideration with the accompanying drawing, in which the same or equivalent members are indicated by the same reference numerals and characters and in which:

FIG. 1 is a diagram of a lubricant supply system embodying the present invention;

FIG. 2 is an enlarged cross-sectional elevation of one embodiment of this invention;

FIG. 3 is a plan view of a modified second lubricant supply device; and

FIG. 4 is a sectional view of the device shown in FIG. 3, taken along a line X—X.

Referring now to FIG. 1 of the accompanying drawing a lubricant such as grease is supplied from a pump 1 to one group of parts $a$ requiring a lubricant supply supply, such as bearings of machines, via a main line 2 and a plurality of serially connected lubricant supply or distributing devices 3, 4, 5, 6, 7 and 8. As is well known in the art, when the lubricant pressure in the main line 2 reaches a predetermined value, a change-over device (not shown) will operate to supply the lubricant under pressure to another main line 9 thereby supplying lubricant to other groups of parts $ab$ requiring a lubricant supply through the respective lubricant supply devices. The lubricant supply devices 3 to 8 inclusive have the same construction as that of a well-known type and each hereinafter will be referred to as the "first" or "primary lubricant supply device." While in the drawing a lubricant supply system of the loop type is shown, it will be understood that this invention can equally be embodied in the so-called end type.

In accordance with this invention, the lubricant outlet pipe or line 10 of one of the primary lubricant supply devices for example, device 8, is connected to a lubricant inlet port 48 of a secondary lubricant supply device 11. In addition to the distributing valves similar to those of the primary lubricant supply device, a combined change-over and distributing valve is included in the secondary distributing valve as will be more fully described later. If required, a plurality of lubricant supply devices 14 and 15 similar to the primary lubricant supply device may be connected with the secondary lubricant supply device.

As will be described in more detail later, the distributing valves in the secondary lubricant supply device are operated by the lubricant under pressure supplied to the inlet port 48 to successively supply lubricant to the desired parts $b$ and $bb$ requiring a lubricant supply.

Referring now to FIG. 2, a plurality of parallel spaced cylinders 19, 20 and 21 are provided in a casing 8$a$ of the primary lubricant supply device 8. In a cylinder 19, there are slidably disposed a plurality of axially spaced pistons 16, 16$a$ and 16$b$ which are connected in tandem by a piston rod 16$c$ to form a distributing valve. There are also two axially spaced lubricant outlet ports 22 and 23 opening near the center of the cylinder 19.

Similarly, the cylinder 20 has a distributing valve comprising axially spaced pistons 17, 17a and 17b interconnected in tandem by a piston rod 17c, and a pair of lubricant outlet ports 24 and 25; and the cylinder 21 has a distributing valve comprising a plurality of axially spaced pistons 18, 18a and 18b interconnected in tandem by a piston rod 18c, and a pair of lubricant outlet ports 26 and 27.

One end of each of the main pipes or lines 2 and 9 is respectively connected with one of the opposite ends of the cylinder 19, and adjacent cylinders are connected by inclined conduits or passageways 28, 29 and 30, 31, the left hand ends of these conduits open into the central portion of the preceding cylinder, and the other ends communicate with the opposite ends of the succeeding cylinder. The main lines 2a and 9a lead to another lubricant supply device with one of their ends opening into the central portion of the cylinder 21 and the other of their ends communicating with the opposite ends of the first cylinder in another lubricant supply device of the same construction.

The casing 11a of the secondary lubricant supply device is also provided with a plurality of spaced parallel cylinders 35, 36 and 37. The first cylinder 35 contains a combined change-over and distributing valve comprising four axially spaced pistons 32, 32a, 32b and 32c which are connected in tandem by a piston rod 32d, said cylinder being also provided with axially spaced lubricant outlet ports 38 and 39 at its central portion. This distributing valve has an integral rod 32e extending through the upper wall of the casing 11a to indicate the state of changing over of the lubricant paths. Similarly, each of the cylinders 36 and 37 contains a tandem distributing valve respectively comprising three pistons 33, 33a, 33b and 34, 34a, 34b and piston rods 33c and 34c. These cylinders are also provided with a pair of axially spaced lubricant outlet ports 40, 41 and 42, 43, respectively, at their central portions. Pairs of inclined lubricant conduits or passageways 44, 45 and 46, 47 interconnect adjacent cylinders in the same manner as in the primary lubricant supply device. The casing 11a is provided with a lubricant inlet port 48 which communicates at one end with the central portion of the cylinders 35, 36 and 37 and at the other end with one of the outlet ports of the primary lubricant supply device 8, for example outlet port 23, through a pipe 10 and a conduit 49.

The operation of this lubricant supply device is as follows.

The lubricant, such as grease, supplied under pressure from the pump 1 or the like is supplied to the lower end of the cylinder 19 via one of the main pipes, for example line 9, to force upwardly the distributing valve disposed therein as shown in FIG. 2. Then the inclined passageway or conduit 29 will be connected with the main pipe 9, the lubricant outlet port 22 will be opened between the pistons 16 and 16a, and the lubricant outlet port 23 will be closed by the piston 16b with the result that the lubricant under pressure supplied to the lower end of the cylinder 20 will force upwardly the distributing valve disposed therein to supply the lubricant above the piston 17 to the desired point of lubrication, not shown, through the conduit 28 and the outlet port 22. It is assumed that the quantity of lubricant supplied is 0.3 cubic centimeter, for example. Upward movement of the distributing valve in the cylinder 20 will cause the outlet port 24 to open, the outlet port 25 to close, and to be supplied the lubricant to the lower end of the cylinder 21 through the inclined conduit 31. The distributing valve in the cylinder 21 will be forced upwardly to supply the lubricant contained therein above the piston 18 through the conduit 30 and the lubricant outlet port 24.

When the distributing valve in the cylinder 21 moves upwardly, the lubricant under pressure is supplied to the lower end of the first cylinder in the succeeding lubricant supply device through a pipe 9a to raise the distributing valve in the first cylinder, and the lubricant in this cylinder is supplied through a pipe 2a and the lubricant outlet port 26 which is now opened. In the same manner, all portions requiring oiling are sequentially supplied with lubricant.

Upon finishing lubricant supply to all portions, the lubricant is changed-over from the main pipe 9 to the main pipe 2 by a change-over device not shown, responsive to a predetermined rise in pressure in the main pipe 9.

The lubricant in the main pipe 2 is supplied to the upper portion of the cylinder 19 to force the distributing valve downwardly to close the lubricant outlet port 22 by the piston 16, to open the outlet port 23 between the pistons 16a and 16b and to connect the inclined conduit 28 to the main pipe 2 through cylinder 19. Thus, the lubricant is supplied to the upper end of the cylinder 20 to move downwardly the distributing valve therein to supply the lubricant contained in the bottom portion of the cylinder to the outlet port 23 through the inclined conduit 29. Lubricant supplied to the outlet port 23 is supplied into the inlet port 48 through the conduit 49 and the pipe 10.

Assuming now that the combined change-over and distributing valve in the cylinder 35 is in its lower position, it will be noted from FIG. 2 that the inclined conduit 45 will communicate with the inlet port 48, lubricant outlet port 38 will be opened between the pistons 32 and 32a and the outlet port 39 will be closed by the piston 32b. Thus the lubricant under pressure in the inlet port 48 will be introduced into the lower portion of the cylinder 36 via the conduit 45 to force upwardly the distributing valve therein whereby to supply the lubricant in the upper portion of the cylinder to the outlet port 38 through the inclined conduit 44. The quantity of the lubricant supplied through the port 38 is the same as that supplied through the port 23, i.e. 0.3 cc., in this case. When the amount of lubricant supplied through the port 23 exceeds this predetermined value, the lubricant is then supplied to the lower portion of the cylinder 37 via the conduit 47 whereby to similarly supply the lubricant contained in the upper portion of the cylinder 37 through the conduit 46 and outlet port 40. If the lubricant is continuously supplied to the inlet port 48, then the lubricant will be introduced into the lower portion of the cylinder 35 through a pipe 13 to force upwardly the combined change-over and distributing valve therein whereby the lubricant contained in the upper portion of the cylinder 35 will be forced out through a pipe 12 and a lubricant outlet port 42. At the same time communication between conduit 45 and inlet port 48 will be interrupted by the piston 32b while the conduit 44 is connected with the port 48. The outlet port 38 will be closed by the piston 32a, while the outlet port 39 will be opened between the pistons 32b and 32c. Then the lubricant will be supplied to the upper portion of the cylinder 36 to force downwardly the piston therein and then be supplied to the upper portion of the cylinder 37. In this way, the lubricant contained in the lower portion of the cylinders 36 and 37 will be sequentially supplied through the outlet ports 39 and 41, respectively, when pistons in the cylinders 36 and 37 move downward. After the piston in the cylinder 37 has been moved to its lower position, lubricant will be supplied to the upper portion of the cylinder 35 through the pipe 12 to force downward the combined change-over and distributing valve therein whereby to supply the lubricant in the lower portion of the cylinder 35 to the outlet port 43 through the pipe 13.

While in FIG. 2, only one secondary lubricant supply device 11 having a combined change-over and distributing valve has been shown, any desired number of conventional lubricant supply devices, as shown for example, by reference numeral 8, FIG. 2, may be connected in series with the device 11, as diagrammatically shown in FIG. 1.

Referring now to FIGS. 3 and 4, there is shown a modification of the secondary lubricant supply device wherein six cylinders 35, 36, 37, 50, 51 and 52 are arranged in two rows in a common casing 11a, thus eliminating the necessity of providing outside pipes such as pipes 12 and 13 in FIG. 2. As mentioned above, FIG. 4 is an unfolded sectional view of FIG. 3 along a line X—X, so that cylinder 35 is shown in duplicate, one in full lines and the other in dotted line at the right hand portion of FIG. 4. Thus, these six cylinders form a closed circuit along a rectangle to which lubricant under pressure is supplied through the inlet port 48. As in the first embodiment shown in FIG. 2, the valve contained in the cylinder 35 is a combined change-over and distributing valve having an indicating rod 32e and four pistons, while the valves in the remaining cylinders are mere distributing valves.

The operation of this embodiment is the same as that of the first embodiment. Thus, lubricant under pressure supplied to the inlet port 48 at first forces downward the combined change-over and distributing valve in the cylinder 35 and then sequentially moves upwardly respective distributing valves in the succeeding cylinders 36, 37, 50, 51 and 52, as shown in FIG. 4. When the distributing valve in the last cylinder 52 moves upward, the combined change-over and distributing valve in the cylinder 35 is forced in the upward direction as shown by dotted lines in FIG. 4. Thereafter, the distributing valves in the following cylinders 36, 37, 50, 51 and 52 are sequentially forced in downward direction. This cycle of operation continues until the supply of lubricant under pressure to the inlet port 48 is interrupted.

It will be understood that the above embodiments are shown only for the purpose of illustration of this invention, and that various changes and modifications may be made without departing from the true scope of this invention as defined in the appended claims.

What we claim:

A lubricant supply device comprising the combination of a primary lubricant supply device and a secondary lubricant supply device, said primary lubricant supply device comprising a casing, a plurality of spaced parallel cylinders disposed in said casing and including a first cylinder and a last cylinder, each of said cylinders being provided with a pair of axially-spaced lubricant outlet ports disposed in a central portion thereof, a distributing valve slidably disposed in each of said cylinders, each distributing valve comprising a piston rod supporting in tandem a plurality of axially-spaced pistons, a pair of axially-spaced inclined lubricant conduits between adjacent cylinders each having one end opening into the central portion of the preceding cylinder and an opposite end opening into the opposite ends of the succeeding cylinder, a second pair of inclined lubricant conduits each having one end opening into the opposite ends of said first cylinder and having an opposite end communicating with a source of lubricant supply outside of said casing, and a third pair of lubricant conduits each having one end opening into the central portion of said last cylinder and an opposite end opening to the outside of said casing, said secondary lubricant supply device comprising a casing, a plurality of spaced parallel secondary cylinders disposed in said casing and connected in a closed circuit and including a first secondary cylinder and a last secondary cylinder, a pair of lubricant outlet ports provided for each secondary cylinder in axially-spaced relationship in a central portion thereof, a pair of axially-spaced inclined lubricant conduits between adjacent secondary cylinders each having one end opening into the central portion of a preceding secondary cylinder and an opposite end opening into the opposite ends of the succeeding secondary cylinder, a lubricant inlet port communicating with the central portion of the respective secondary cylinders, a second pair of lubricant conduits each having one end opening axially spaced away from the central portion and outwardly of said outlet ports of the last secondary cylinder and an opposite end opening into the opposite ends of the first secondary cylinder, a combined change-over and distributing valve slidably disposed in one of said secondary cylinders, and a plurality of distributing valves each slidably disposed in each of the other secondary cylinders, each of said distributing valves of said secondary device comprising a piston rod supporting in tandem a plurality of axially-spaced pistons, said distributing valves of both of said devices being operable in operation to two positions alternately for blocking off communication to one of said inclined conduits of a given pair and providing communication with the other inclined conduit of said given pair, and means to connect said lubricant inlet port of the secondary lubricant supply device with one of the lubricant outlet ports of the primary lubricant supply device, with said inlet port communicating with each of said secondary cylinders between said outlet ports of said secondary cylinders.

References Cited in the file of this patent

UNITED STATES PATENTS

| | | |
|---|---|---|
| 2,146,424 | Dirkes | Feb. 7, 1939 |
| 2,834,433 | Higgens | May 13, 1958 |
| 2,857,019 | Almasi | Oct. 21, 1958 |
| 2,986,234 | Akamatsu et al. | May 30, 1961 |
| 3,038,557 | Callahan | June 12, 1962 |